US011420669B2

(12) United States Patent
Dubay et al.

(10) Patent No.: US 11,420,669 B2
(45) Date of Patent: Aug. 23, 2022

(54) ADJUSTMENT LEVER DECELERATION ASSEMBLY FOR A STEERING COLUMN

(71) Applicant: Steering Solutions IP Holding Corporation, Saginaw, MI (US)

(72) Inventors: Robert W. Dubay, Saginaw, MI (US); Damian Z. Gosztyla, Bay City, MI (US); Robert D. Bueche, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/118,133

(22) Filed: Dec. 10, 2020

(65) Prior Publication Data

US 2021/0309279 A1    Oct. 7, 2021

Related U.S. Application Data

(60) Provisional application No. 63/004,989, filed on Apr. 3, 2020.

(51) Int. Cl.
| | | |
|---|---|---|
| *B62D 1/184* | (2006.01) | |
| *G05G 1/04* | (2006.01) | |
| *F16D 59/00* | (2006.01) | |
| *G05G 5/03* | (2008.04) | |
| *B62D 1/185* | (2006.01) | |
| *B62D 1/189* | (2006.01) | |

(52) U.S. Cl.
CPC ............. *B62D 1/184* (2013.01); *F16D 59/00* (2013.01); *G05G 1/04* (2013.01); *G05G 5/03* (2013.01); *B62D 1/185* (2013.01); *B62D 1/189* (2013.01); *F16D 2250/0007* (2013.01); *G05G 2505/00* (2013.01)

(58) Field of Classification Search
CPC .................................................. G05G 2505/00
See application file for complete search history.

(56) References Cited

U.S. PATENT DOCUMENTS

| | | | | |
|---|---|---|---|---|
| 5,570,610 | A  * | 11/1996 | Cymbal ................. | B62D 1/184 74/493 |
| 2012/0285286 | A1* | 11/2012 | Schnitzer ............... | B62D 1/195 74/493 |
| 2016/0272234 | A1* | 9/2016 | Terasawa ............... | B62D 1/185 |
| 2017/0267273 | A1* | 9/2017 | Jones ..................... | B62D 1/184 |
| 2019/0382044 | A1* | 12/2019 | Vincent .................. | B60R 21/09 |

* cited by examiner

*Primary Examiner* — Vicky A Johnson
(74) *Attorney, Agent, or Firm* — Dickinson Wright PLLC

(57) ABSTRACT

An adjustment lever deceleration assembly for a steering column includes an adjustment lever rotatable between a locked position and an unlocked position. The adjustment lever deceleration assembly also includes a component positioned proximate the adjustment lever, the component rotating at a speed less than a rotational speed of the adjustment lever during adjustment between the locked position to the unlocked position. The adjustment lever deceleration assembly further includes an adjustment lever decelerator integrally formed with the adjustment lever, the adjustment lever decelerator positioned on the adjustment lever to contact the component during rotation of the adjustment lever toward the unlocked position, wherein the adjustment lever deflects and absorbs energy upon contact with the component.

14 Claims, 4 Drawing Sheets

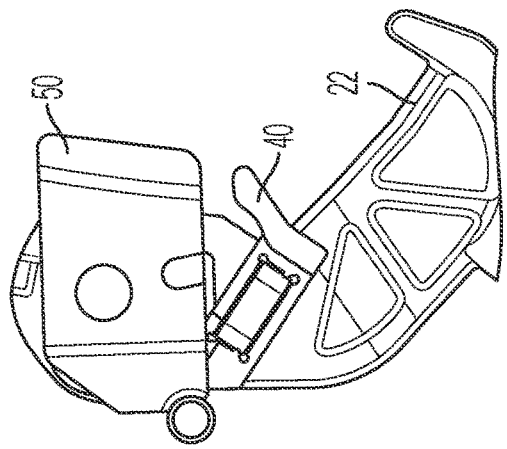
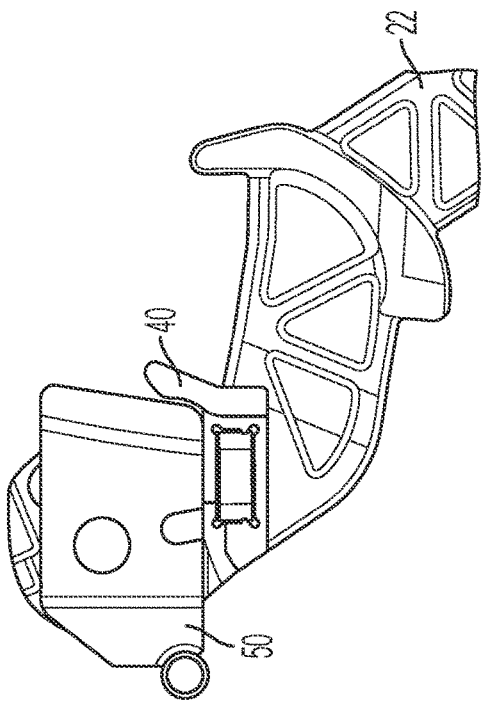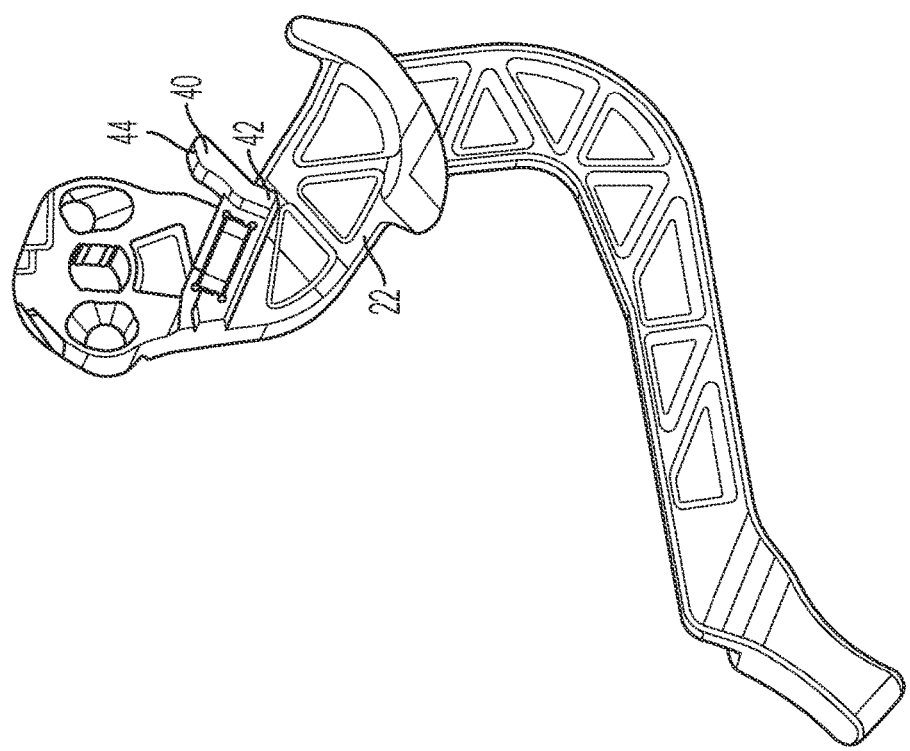

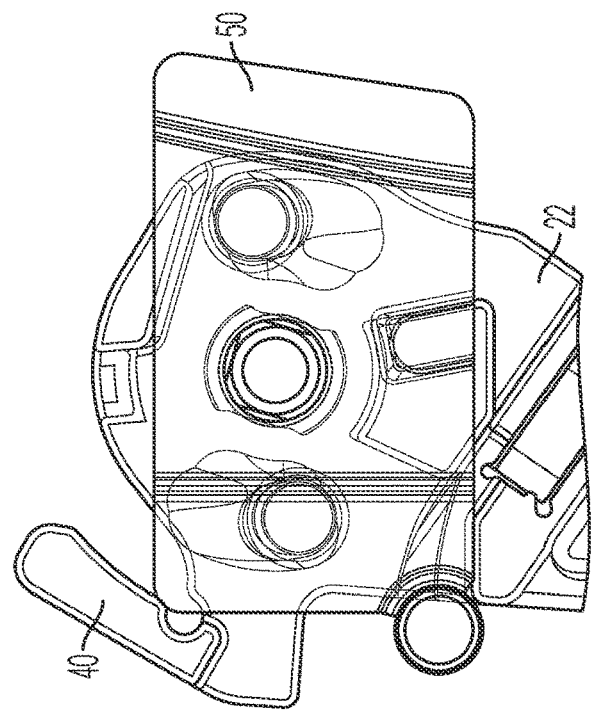
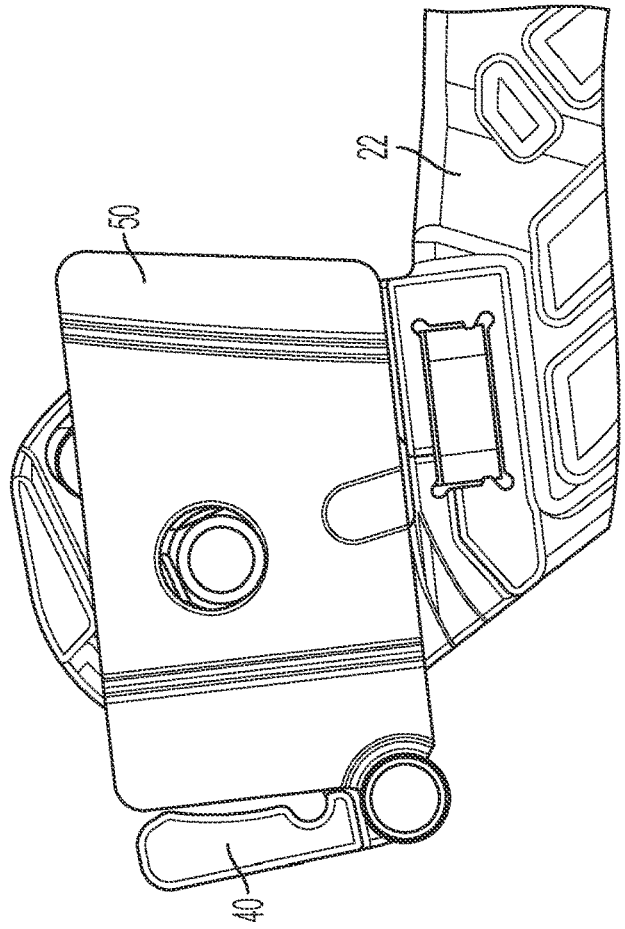

ADJUSTMENT LEVER DECELERATION ASSEMBLY FOR A STEERING COLUMN

CROSS-REFERENCE TO RELATED APPLICATION

This patent application claims the benefit of priority to U.S. Provisional Patent Application Ser. No. 63/004,989, filed Apr. 3, 2020, the disclosure of which is incorporated by reference herein in its entirety.

BACKGROUND

The embodiments described herein relate to steering columns and, more particularly to an adjustment lever deceleration assembly for steering columns.

Rake and/or telescope adjust steering columns commonly use either a linear or rotary actuation of a lever to lock a steering column's rake and/or telescoping adjustment position. The actuation motion, in the locking direction, is typically used to generate clamp tension to maintain an adjustment position or to delash a system to meet noise, vibration and harshness (NVH) requirements. When actuating the adjustment levers, in the unlock direction, it is common for the lever to accelerate towards the unlock position if the operator does not maintain a grasp on the lever. The stored clamp energy can create a reversal torque that accelerates the lever towards the unlock lever stop. This acceleration away from the operator's initially applied unlocking load can create unwanted noise, wear and/or lever over-travel conditions.

SUMMARY OF THE DISCLOSURE

According to one aspect of the disclosure, an adjustment lever deceleration assembly for a steering column includes an adjustment lever rotatable between a locked position and an unlocked position. The adjustment lever deceleration assembly also includes a component positioned proximate the adjustment lever, the component rotating at a speed less than a rotational speed of the adjustment lever during adjustment between the locked position to the unlocked position. The adjustment lever deceleration assembly further includes an adjustment lever decelerator integrally formed with the adjustment lever, the adjustment lever decelerator positioned on the adjustment lever to contact the component during rotation of the adjustment lever toward the unlocked position, wherein the adjustment lever deflects and absorbs energy upon contact with the component.

According to another aspect of the disclosure, a steering column assembly includes a jacket assembly. The steering column assembly also includes an adjustment lever rotatable between a locked position and an unlocked position. The steering column assembly further includes an adjustment lever decelerator integrally formed with the adjustment lever, the adjustment lever decelerator positioned on the adjustment lever to contact the jacket assembly during rotation of the adjustment lever toward the unlocked position, wherein the adjustment lever deflects and absorbs energy upon contact with the jacket assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a perspective view of the adjustment lever with an integrated decelerator;

FIG. 3 is a perspective view of the adjustment lever in a locked position;

FIG. 4 is a perspective view of the adjustment lever in an unlocked position;

FIG. 7 is a perspective view of the adjustment lever with the integrated decelerator of FIG. 5, the adjustment lever in the locked position; and FIG. 8 is a perspective view of the adjustment lever with the integrated decelerator of FIG. 5, the adjustment lever in the unlocked position.

DETAILED DESCRIPTION

Referring now to the Figures, where the invention will be described with reference to specific embodiments, without limiting same, an adjustment lever deceleration assembly for steering columns is provided, as will be appreciated from the disclosure herein.

Figure 1:
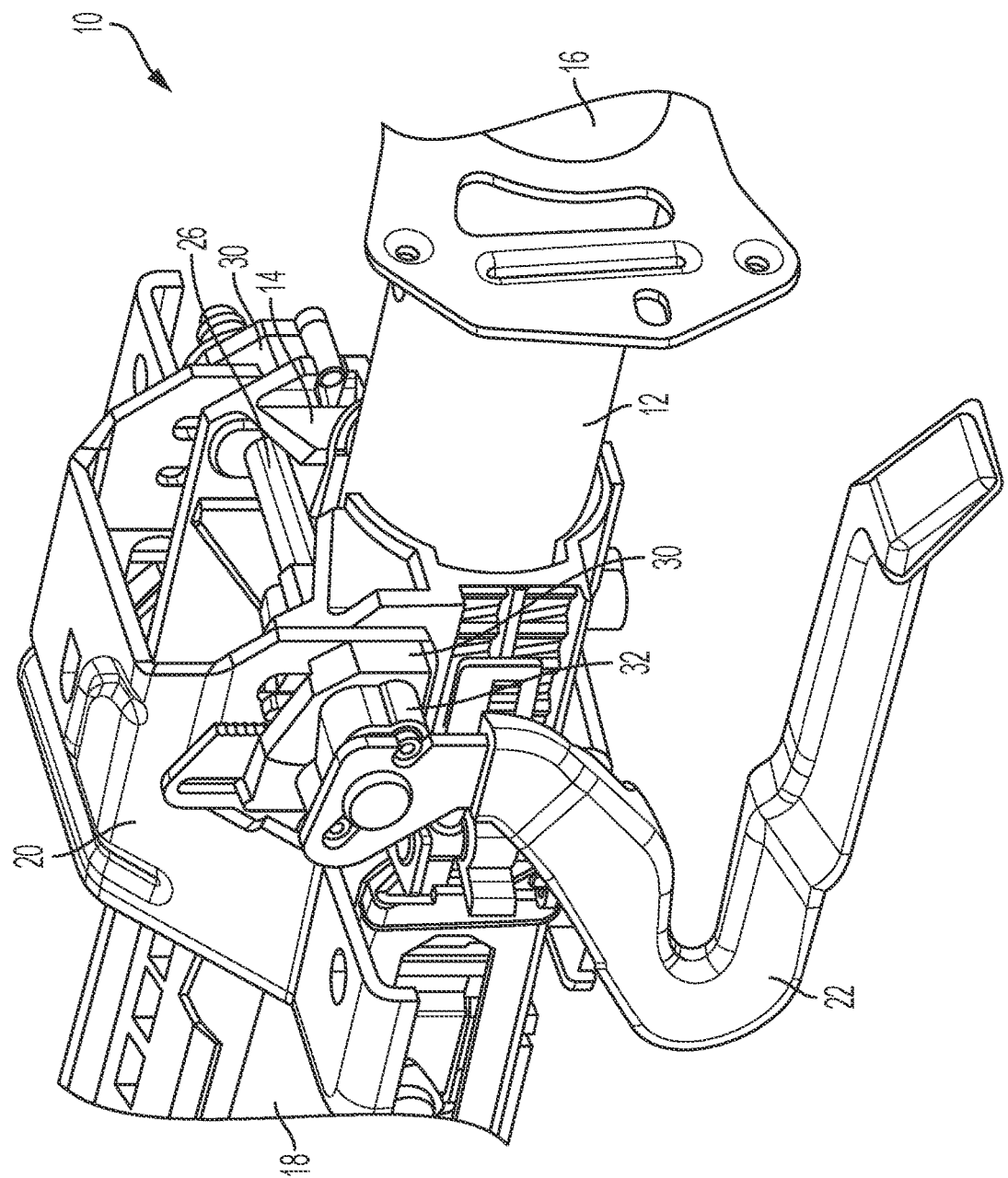
FIG. 1 is a perspective view of a steering column assembly with an adjustment lever.
Figure 6:
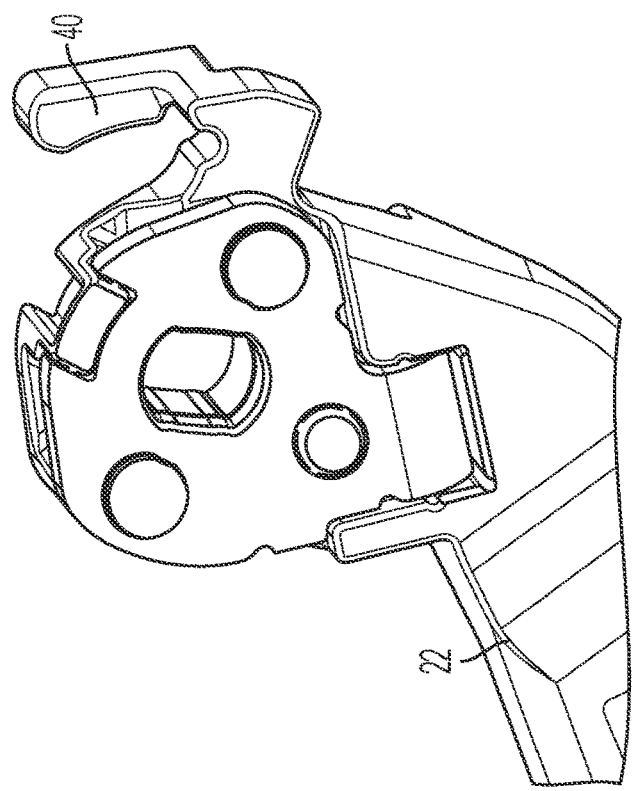
FIG. 6 is a second side perspective view of the adjustment lever with the integrated decelerator of FIG. 5.
Figure 5:
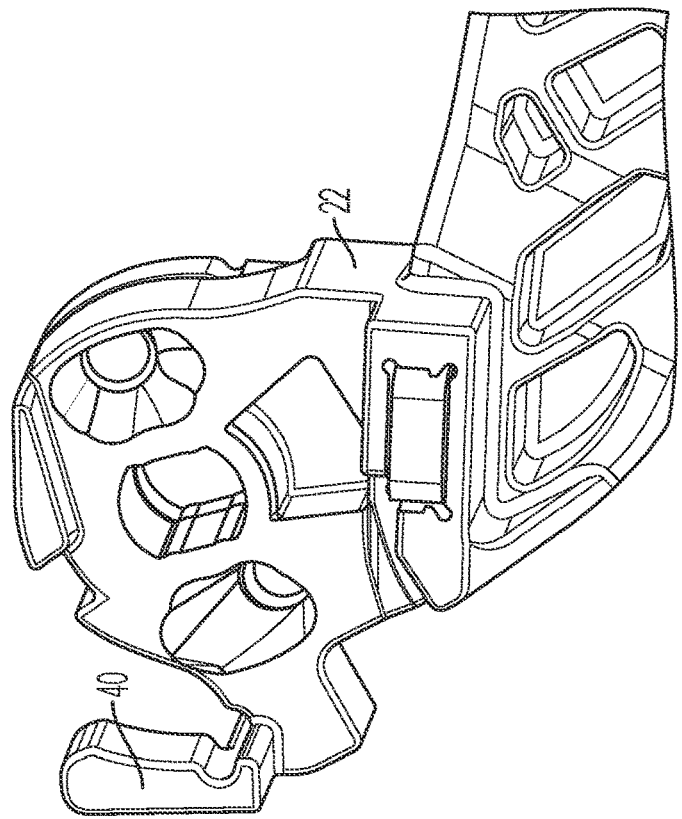
FIG. 5 is a first side perspective view of the adjustment lever with an integrated decelerator according to another aspect of the disclosure.

Referring now to FIG. 1, a portion of a steering column is illustrated and generally referenced with numeral 10. The steering column 10 includes several components, including an upper jacket 12 and a lower jacket 14 that are telescopingly engaged with each other in an axial direction (i.e., longitudinal direction of steering column). A first side 16 of the portion of the steering column 10 is closer to the driver, where a steering wheel would be positioned. A second side 18 of the portion of the steering column 10 is closer to a steering gear for controlling a position of road wheels.

The steering column 10 may be used in any type of vehicle that requires steering operation. A mounting bracket 20 is operatively coupled to the steering column to fix the steering column 10 to the vehicle and to allow adjustment or relative motion of components of the steering column 10. Adjustment is facilitated by manipulation of an adjustment lever 22 that is operatively coupled to the lower jacket 14. In particular, the adjustment lever 22 is coupled to a clamp bolt 26 that extends in a transverse direction through apertures of the upper jacket 12 and through bracket apertures of the mounting bracket 20. Spaced outwardly of the mounting bracket 20 are one or more components on each side of the mounting bracket 20 in some embodiments. For example, a spacer 30 may be disposed on each side of the mounting bracket 20. Additionally, a mounting element 32 may be included to provide structural stability for the adjustment lever 22. Each of the additional components disposed outwardly of the mounting bracket 20 include respective apertures configured to receive the clamp bolt 26 therethrough to align the components with the mounting bracket 20.

Actuation of the adjustment lever 22 allows a user to switch the steering column between a locked and an unlocked condition. In the unlocked condition, a user is able to adjust one or more components of the steering column 10 to reposition the steering column 10 to suit the user's preference. In the locked condition, relative movement of components of the steering column 10 is inhibited. Actuation motion (e.g., rotation, pivoting, etc.) of the adjustment lever 22 in the locking direction generates clamp tension by the lower jacket 14 on the upper jacket 12 to maintain an adjustment position. When actuating the adjustment lever 22, in the unlock direction, it is common for the adjustment lever 22 to accelerate towards the unlock position if the operator does not maintain a grasp on the adjustment lever 22. To avoid undesirable aspects associated with acceleration of the adjustment lever 22 when moving in the unlock direction, embodiments of an adjustment lever decelerator are provided and disclosed herein.

Referring now to FIGS. 2-4, the adjustment lever 22 is illustrated in greater detail. The adjustment lever 22 includes an adjustment lever decelerator 40 integrally formed with the adjustment lever 22. In other words, the adjustment lever decelerator 40 and the adjustment lever 22 are a single, unitary component. The integration of the two features may be produced by any suitable manufacturing method. For example, the adjustment lever 22 and the adjustment lever decelerator 40 may be a molded component. In some embodiments, the adjustment lever 22, and therefore the adjustment lever decelerator 40, are at least partially formed of a plastic material.

The adjustment lever decelerator 40 is positioned in an orientation that facilitates contact between the decelerator 40 and a component 50 of the steering column 10. The component 50 may be any component that does not rotate during rotation of the adjustment lever 22 during operation of the adjustment lever 22 at the same rotational speed as the adjustment lever 22. In other words, the component 50 may be fully stationary, relative to the adjustment lever 22 rotation speed, or may rotate at a speed that is less than the adjustment lever 22 rotation speed. In the illustrated embodiment, the component 50 comprises part of the lower jacket 14, however it is to be appreciated that any component that rotates slower—or not at all—relative to the adjustment lever 22 is suitable. In an embodiment where the component 50 rotates, but not as quickly as the adjustment lever 22, the relative rotation of the component 50 and the adjustment lever 22 is designed to ensure that the decelerator 40 contacts the component 50 at a desired location for the benefits of deceleration disclosed herein, while still allowing for sufficient rotational range of travel for the adjustment lever 22 to lock and unlock the steering column 10.

The adjustment lever decelerator 40 extends away from the adjustment lever 22 from a cantilevered end 42 to a free end 44. The cantilevered connection and the material of the decelerator 40 forms a flexible spring finger that can deflect upon contact with the component 50 and to provide deceleration of the adjustment lever 22 as it is moved into the unlocked position of FIG. 4.

In operation, the adjustment lever decelerator 40 rotates with the adjustment lever 22 as the adjustment lever 22 is actuated away from the locked position (FIG. 3) in the unlocking direction. In the locked position shown in FIG. 3, the adjustment lever decelerator 40 is not in contact with the component 50. Upon rotation of the adjustment lever 22 in the unlocking direction, the adjustment lever decelerator 40 contacts the component 50 and deflects about the cantilevered end 42 or some intermediate location of the decelerator 40 to provide a resistance to acceleration of the adjustment lever 22. The resistance effectively decelerates the adjustment lever 22 and dampens undesirable effects associated with unlocking movement of the adjustment lever 22 in an unmitigated manner.

FIGS. 5-8 illustrate another aspect of the disclosure. In particular, the embodiment of FIGS. 5-8 show the adjustment lever 22 that unlocks in an opposite direction as that illustrated in FIGS. 2-4. In the illustrated embodiment of FIGS. 5-8, the adjustment lever 22 is locked in a forward direction of the vehicle and unlocks upon movement rearward relative to the vehicle orientation.

The adjustment lever decelerator 40 of FIGS. 5-8 engages the same or a different component 50, as described in detail above, with operation and functionality of the overall assembly being the same as that of FIGS. 2-4.

The embodiments disclosed herein employ the decelerator 40 that is integrally formed with the adjustment lever 22 to contact a mating component to deflect and absorb energy. As the decelerator 40 absorbs energy, the adjustment lever 22 slows in speed and reduces noise as it reaches the final unlocked position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment lever deceleration assembly for a steering column comprising:
    an adjustment lever rotatable between a locked position and an unlocked position;
    a component positioned proximate the adjustment lever, the component being a stationary, non-rotatable portion of a lower jacket of the steering; and
    an adjustment lever decelerator integrally formed with the adjustment lever, the adjustment lever decelerator positioned on the adjustment lever to contact the component during rotation of the adjustment lever toward the unlocked position, wherein the adjustment lever deflects and absorbs energy upon contact with the component, the contact between the adjustment decelerator and the component limiting the rotational movement of the adjustment lever, wherein the adjustment lever decelerator is a cantilevered finger extending from an edge of the adjustment lever to a free end of the cantilevered finger.

2. The adjustment lever decelerator assembly of claim 1, wherein the adjustment lever and the adjustment lever decelerator are a single, molded component.

3. The adjustment lever decelerator assembly of claim 2, wherein the adjustment lever and the adjustment lever decelerator are a plastic injection molded component.

4. The adjustment lever decelerator assembly of claim 1, wherein the adjustment lever moves forward in a direction of the steering column during movement toward the unlocked position.

5. The adjustment lever decelerator assembly of claim 1, wherein the adjustment lever moves rearward in a direction of the steering column during movement toward the unlocked position.

6. The adjustment lever decelerator assembly of claim 1, wherein the free end of the cantilevered finger contacts the component.

7. The adjustment lever decelerator assembly of claim 1, wherein an edge of the cantilevered finger contacts the component.

8. A steering column assembly comprising:
a jacket assembly;
an adjustment lever rotatable between a locked position and an unlocked position; and
an adjustment lever decelerator integrally formed with the adjustment lever, the adjustment lever decelerator positioned on the adjustment lever to contact a stationary portion of the jacket assembly during rotation of the adjustment lever toward the unlocked position, wherein the adjustment lever deflects and absorbs energy upon contact with the jacket assembly, the contact between the adjustment decelerator and the component limiting the rotational movement of the adjustment lever, wherein the adjustment lever decelerator is a cantilevered finger extending from an edge of the adjustment lever to a free end of the cantilevered finger.

9. The steering column assembly of claim 8, wherein the adjustment lever and the adjustment lever decelerator are a single, molded component.

10. The steering column assembly of claim 9, wherein the adjustment lever and the adjustment lever decelerator are a plastic injection molded component.

11. The steering column assembly of claim 8, wherein the adjustment lever moves forward in a direction of the steering column assembly during movement toward the unlocked position.

12. The steering column assembly of claim 8, wherein the adjustment lever moves rearward in a direction of the steering column assembly during movement toward the unlocked position.

13. The steering column assembly of claim 8, wherein the free end of the cantilevered finger contacts the jacket assembly.

14. The steering column assembly of claim 8, wherein an edge of the cantilevered finger contacts the jacket assembly.

* * * * *